(12) United States Patent
Kang et al.

(10) Patent No.: US 7,377,677 B2
(45) Date of Patent: May 27, 2008

(54) BACKLIGHT ASSEMBLY WITH EXCELLENT LIGHT EFFICIENCY AND DISPLAY DEVICE HAVING THE SAME

(75) Inventors: Jung-Tae Kang, Suwon-si (KR); Yoon-Soo Kwon, Seoul (KR); Woong-Jae Chang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 174 days.

(21) Appl. No.: 11/261,719

(22) Filed: Oct. 28, 2005

(65) Prior Publication Data

US 2006/0203464 A1  Sep. 14, 2006

(30) Foreign Application Priority Data

Mar. 9, 2005   (KR) ...................... 10-2005-0019516

(51) Int. Cl.
*F21Y 103/00* (2006.01)
(52) U.S. Cl. ...................... 362/561; 362/225; 362/249; 349/70
(58) Field of Classification Search ................ 362/249, 362/224, 225, 559, 560, 561; 349/70
See application file for complete search history.

(56) References Cited

U.S. PATENT DOCUMENTS

| | | | |
|---|---|---|---|
| 6,527,414 B2 * | 3/2003 | Moon | ........................... 362/249 |
| 6,820,997 B2 | 11/2004 | Bissada | |
| 2004/0008512 A1 * | 1/2004 | Kim | ........................... 362/235 |
| 2005/0013134 A1 * | 1/2005 | Yoo et al. | .................... 362/235 |
| 2005/0243540 A1 * | 11/2005 | Kim | ........................... 362/97 |
| 2006/0002107 A1 * | 1/2006 | Jeong | ........................ 362/225 |
| 2007/0076142 A1 * | 4/2007 | Ohshima et al. | .............. 349/70 |

FOREIGN PATENT DOCUMENTS

| | | |
|---|---|---|
| JP | 10039808 | 2/1998 |
| JP | 2001210131 | 8/2001 |
| JP | 2001215497 | 8/2001 |
| JP | 2003084280 | 3/2003 |
| JP | 2003346537 | 12/2003 |
| JP | 2004006256 | 1/2004 |
| KR | 1020020067232 | 8/2002 |
| KR | 1020030095764 | 12/2003 |
| KR | 1020040000625 | 1/2004 |
| KR | 1020040058574 | 7/2004 |
| KR | 10-2004-0029771 | * 9/2004 |

* cited by examiner

*Primary Examiner*—Laura Tso
(74) *Attorney, Agent, or Firm*—Cantor Colburn LLP (57) ABSTRACT

A backlight assembly with excellent light efficiency and a display device provided with the backlight assembly is provided where the backlight assembly includes a plurality of light sources longitudinally arranged in parallel to each other, and a fixing member receiving the plurality of light sources. When a display area, formed by light emitted from the plurality of light sources, is divided by the plurality of light sources into a plurality of display area sections, an average area of the display area sections between light sources adjacent to each other is less than or equal to an area of a display area section between an edge of the display area and the light source most adjacent thereto.

25 Claims, 8 Drawing Sheets

BACKLIGHT ASSEMBLY WITH EXCELLENT LIGHT EFFICIENCY AND DISPLAY DEVICE HAVING THE SAME

This application claims priority to Korean Patent Application No. 2005-0019516, filed on Mar. 9, 2005 and all the benefits accruing therefrom under 35 U.S.C. §119, and the contents of which in its entirety are herein incorporated by reference.

BACKGROUND OF THE INVENTION (a) Field of the Invention

The present invention relates to a backlight assembly with excellent light efficiency and a display device provided with the backlight assembly, and more particularly, the present invention relates to a backlight assembly with light efficiency enhanced by changing an arrangement of light sources and a display device provided with the same.

(b) Description of the Related Art

Due to recent developments in semiconductor technologies, the demand for display devices having small size, small weight, and high performance has increased dramatically.

Liquid crystal display ("LCD") devices have advantages such as small size, small weight, and low power consumption. Therefore, much attention has been paid to LCD devices as a substitute for cathode ray tubes ("CRTs"). LCD devices are widely used for office or home appliances, such as monitors and televisions that require a display device.

Generally, LCD devices change a specific molecular alignment of liquid crystal to different molecular alignments with an application of a voltage, and convert a change in optical characteristics, such as birefringence, optical rotary power, dichroism, and optical scattering, of liquid crystal cells emitting light due to the change in molecular alignment into a visual change. That is, LCD devices display information by using optical modulation in the liquid crystal cells.

The LCD device is not a self-emitting device, and is instead a light receiving display device that requires a backlight assembly for supplying light to display an image. The backlight assembly includes a light source for emitting light. A large-sized LCD device, such as an LCD television, is provided with a plurality of light sources so as to provide a clear image.

In such a large-sized LCD device, light emitted from the light sources forms a display area. The display area is an area from which the light is emitted, and serves to supply the light to an LCD panel to display an image. The brightness of the large-sized LCD device is usually lower at the edges than at the center.

Conventionally, such a problem is solved by disposing the light sources close to the edges of the display area. In this case, unnecessary light is concentrated on the edges, thereby causing optical loss. In addition, since the pitches between lamps are widened, bright lines may be generated. In order to prevent the generation of the bright lines, a distance between the lamps and a diffusing plate positioned thereon can be widened. However, this causes an increased thickness of the LCD device.

When the light sources are disposed adjacent to the edges of the display area, the light sources are spaced further apart from each other in the center region of the display area, thereby causing a problem of decreased brightness at the center region of the display area. Since viewers tend to concentrate their eyes on the center of the LCD television rather than the edges thereof, such viewers judge the definition of an image with reference to the center of the screen and thus visualize a decrease in brightness with their naked eyes.

BRIEF SUMMARY OF THE INVENTION

The present invention solves the above-mentioned problems by providing a backlight assembly having a structure that can enhance light efficiency from the view point of visibility.

The present invention also provides a display device having the above-mentioned backlight assembly.

An exemplary embodiment of the backlight assembly according to the present invention includes a plurality of light sources longitudinally arranged in parallel to each other, and a fixing member receiving the plurality of light sources. When a display area, formed by light emitted from the plurality of light sources, is divided by the plurality of light sources into a plurality of display area sections, an average area of the display area sections between light sources adjacent to each other is less than or equal to an area of a display area section between an edge of the display area and the light source most adjacent thereto.

Preferably, the backlight assembly further includes a reflecting member disposed on the fixing member and reflecting the light emitted from the light sources. A side surface of the reflecting sheet extending in a length direction of the light sources is formed as an inclined surface and an inclination angle of the inclined surface is less than or equal to 50° with respect to a bottom surface of the fixing member.

The reflecting member may be a reflecting sheet.

An edge of the side surface of the reflecting member may extend to a greater height within the fixing member than a height of the light sources received within the fixing member.

A diffusing plate may be supported on an edge of the side surface of the reflecting member.

An inner side surface of the fixing member extending in a length direction of the light sources is also preferably formed as an inclined surface and an inclination angle of the inclined surface is less than or equal to 50°.

A reflecting member may line the inner side surface and a bottom interior surface of the fixing member having the inclined surface.

The light sources may be arranged denser toward a center of the display area.

A distance between a pair of light sources that are adjacent to each other in a central region of the display area is less than a distance between a pair of light sources adjacent to each other that are closer to the edge of the display area.

A distance between the edge of the display area and a point of the display area corresponding to a center of the light source most adjacent thereto is greater than or equal to a pitch between light sources adjacent to each other.

A distance between the edge of the display area and a point of the display area corresponding to a center of the light source most adjacent thereto is preferably in the range from 20 mm to 24 mm.

The fixing member may be made of a metal.

The plurality of light sources may be collected together and then form a flat fluorescent lamp.

The light sources may be lamps, or may include line light sources having light emitting diodes.

Each light source extends parallel to the edge of the display area.

An exemplary embodiment of the display device according to the present invention includes a panel unit displaying an image, and a backlight assembly supplying light to the panel unit. The backlight assembly includes a plurality of light sources longitudinally extending in parallel to each other and a fixing member receiving the plurality of light sources. When a display area, formed by light emitted from the light sources, is divided by the plurality of light sources into a plurality of display area sections, an average area of the display area sections between light sources adjacent to each other is less than or equal to an area of a display area section between an edge of the display area and the light source most adjacent thereto.

Preferably, the display device further includes a reflecting member disposed on the fixing member and reflecting the light emitted from the light sources. The side surface of the reflecting member extending in a length direction of the light sources is formed as an inclined surface and an inclination angle of the inclined surface is less than or equal to 50°.

The reflecting member may be a reflecting sheet.

An inner side surface of the fixing member extending in a length direction of the light sources may be formed as an inclined surface and an inclination angle of the inclined surface is less than or equal to 50°.

The light sources may be arranged denser toward a center of the display area.

Preferably, a distance between the edge of the display area and a point of the display area corresponding to a center of the light source most adjacent thereto is greater than or equal to a pitch between the light sources adjacent to each other.

A distance between the edge of the display area and a point of the display area corresponding to a center of the light source most adjacent thereto is preferably in the range from 20 mm to 24 mm.

The plurality of light sources may be collected together and then form a flat fluorescent lamp.

The light sources may be lamps.

The fixing member may be made of a metal.

The panel unit may be a liquid crystal display panel.

The display device may be assembled within a television unit.

An exemplary embodiment of a method of enhancing a display image to a viewer includes providing a plurality of light sources, forming a display area by light emitted from the plurality of light sources, arranging the plurality of light sources longitudinally in parallel to each other within a fixing member, arranging an outermost light source in parallel with an edge of the display area, and providing a distance between the outermost light source and the edge of the display area that is greater than a distance between light sources that are adjacent to each other increasing brightness in a central region of the display area. The method further includes disposing a reflecting member on the fixing member, and inclining a side surface of the reflecting member with respect to the edge of the display area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
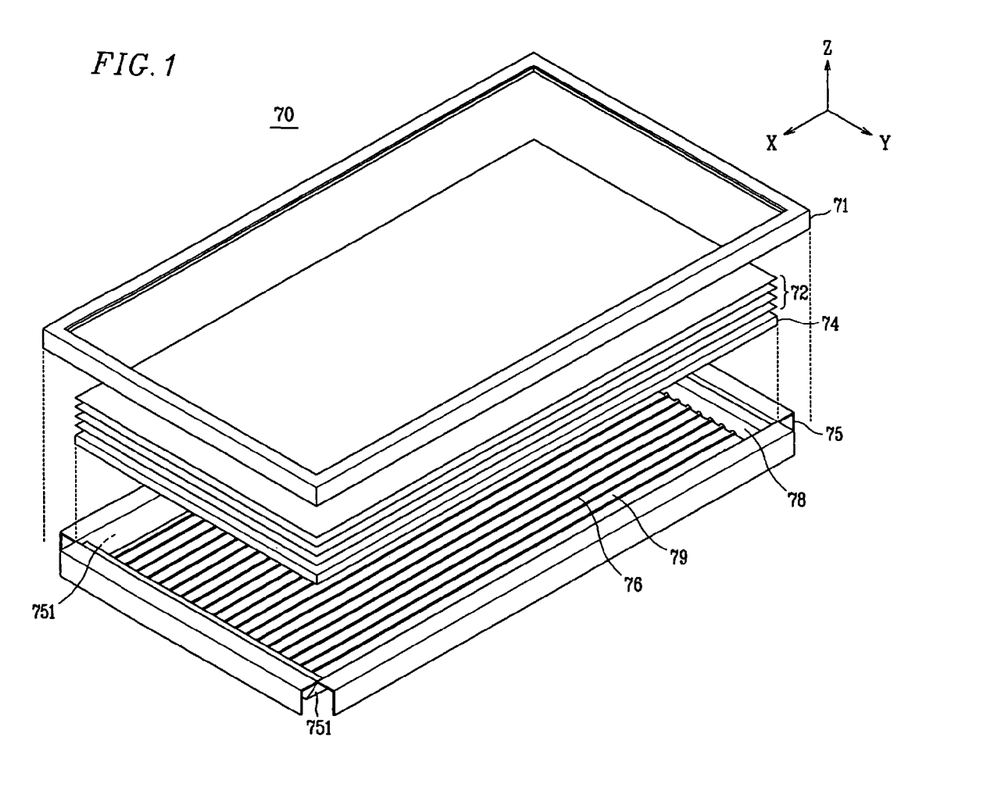
FIG. 1 is an exploded perspective view illustrating a first embodiment of a backlight assembly according to the present invention.

Hereinafter, exemplary embodiments of the present invention will be described in detail with reference to FIGS. 1 to 6. The embodiments are intended not to limit the present invention, but only to exemplify the present invention. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. FIG. 1 shows a first embodiment of a direct type backlight assembly 70 according to the present invention, which is mainly used for a large-sized LCD device, although other applications of the backlight assembly 70 are within the scope of these embodiments. Also, the structure of the backlight assembly 70 shown in FIG. 1 is not intended to limit the present invention, but only to exemplify the present invention. Therefore, the present invention may be applied to backlight assemblies having other structures.

The backlight assembly 70 includes optical sheets 72, a diffusing plate 74, a plurality of light sources 76, a reflecting member 79, and a frame mold side 78. Such elements are received and fixed within a fixing member 75, which serves as a receiving container for the backlight assembly 70. A metal is preferably used for the fixing member in consideration of strength thereof, although other materials having similar properties would be within the scope of these embodiments. As an example, a chassis can be used. The elements are received in the fixing member 75 and are fixed therein by a middle chassis 71.

The backlight assembly 70 diffuses light emitted from the light sources 76 to make the light uniform, and then emits the uniform light to an upper surface (in the Z axis direction) of the backlight assembly 70. That is, a bottom side of the fixing member 75 may represent a lower surface of the backlight assembly 70, and an outermost optical sheet 72 may represent an upper surface of the backlight assembly 70. It should be understood, however, that the backlight assembly 70 may be orientated in any direction, and therefore "upper surface" and "lower surface" do not necessarily correspond to an arrangement of surfaces oriented perpendicularly to a gravitational direction. Instead, with respect to a display area, the "upper surface" of the backlight assembly 70 represents a front most surface of the backlight assembly and a "lower surface" of the backlight assembly represents a rearmost surface of the backlight assembly. Accordingly, the light emitted from the light sources 76 forms a display area on the upper or front most portion of the backlight assembly 70. By "display area", it is meant an area on which an image is actually displayed.

The plurality of light sources 76 emit light in the Z-axis direction towards a front most portion of the backlight assembly. Each of the light sources 76 has a longitudinal axis extending in the X-axis direction such that the light sources 76 are elongated in the X-axis direction within the fixing member 75. The light sources 76 are arranged parallel to each other in the Y-axis direction. Although lamps are shown as the light sources 76 in FIG. 1, the present invention is not limited to lamps. For example, a line light source including light emitting diodes ("LEDs") may be used instead of the lamps. As the lamps, cold cathode fluorescent lamps ("CCFLs") or external electrode fluorescent lamps ("EEFLs") may be used.

The light sources 76 are fixed with lamp holders (not shown) disposed at both ends of each light source 76. Electrode portions of the light sources 76 are fixed with the lamp holders. Wires are drawn from the electrode portions of the light sources 76 and are connected to an inverter (not shown) disposed below the fixing member 75. The inverter converts external power and applies a driving voltage to the light sources 76. The lamp holders are fixed with the frame mold side 78.

The light emitted from the light sources 76 is uniformly diffused when passed through the diffusing plate 74. The light emitted from the light sources 76 is reflected by a reflecting member 79 and goes upward, in the Z-axis direction, towards the front most surface of the backlight assembly 70. Accordingly, it is possible to minimize the optical loss. A white sheet material with excellent reflection efficiency and low cost may be used as the reflecting member 79. The reflecting member 79 can be a reflecting sheet.

The light sources 76 and the diffusing plate 74 are separated by a predetermined distance from each other such that bright lines are not externally generated to a display panel positioned over the backlight assembly 70 due to the light sources 76. The light passing through the diffusing plate 74 securely obtains straightness through a plurality of optical sheets 72. The optical sheets 72 include a prism sheet, and the like, for the purpose of straightening the light. It should be understood than any number of optical sheets 72 may be utilized within the backlight assembly 70, and each optical sheet 72 may perform any necessary optical property to the light passing there through. Furthermore, some embodiments of the backlight assembly 70 may be devoid of any optical sheets 72. In any case, light having uniformity and high brightness is supplied to the upper portion or front most surface of the backlight assembly 70.

The inner side surface 751 of the fixing member 75 is opposed to the light sources 76 along the longitudinal direction of the light sources 76. A first inner side surface 751 of the fixing member 75 is positioned at one side of the fixing member 75, and a second inner side surface 751 is positioned at an opposite side of the fixing member 75. Thus, the light sources 76 extend parallel to the inner side surfaces 751. Each inner side surface 751 is formed as an inclined surface with respect to a bottom side of the fixing member 75 and a side surface of the reflecting member 79 is positioned thereon. Therefore, almost all the light emitted from the light sources 76 is guided upwardly (in the Z axis direction) and thus little optical loss occurs.

Although the inner side surface 751 of the fixing member 75 is formed as an inclined surface in FIG. 1, it is not intended to limit the present invention but only to exemplify the present invention. The side surface of the reflecting member 79 may be formed solely as an inclined surface, as will be further explained below, instead of the inner side surface 751 of the fixing member 75 being inclined with respect to the bottom side of the fixing member 75.

Figure 2:
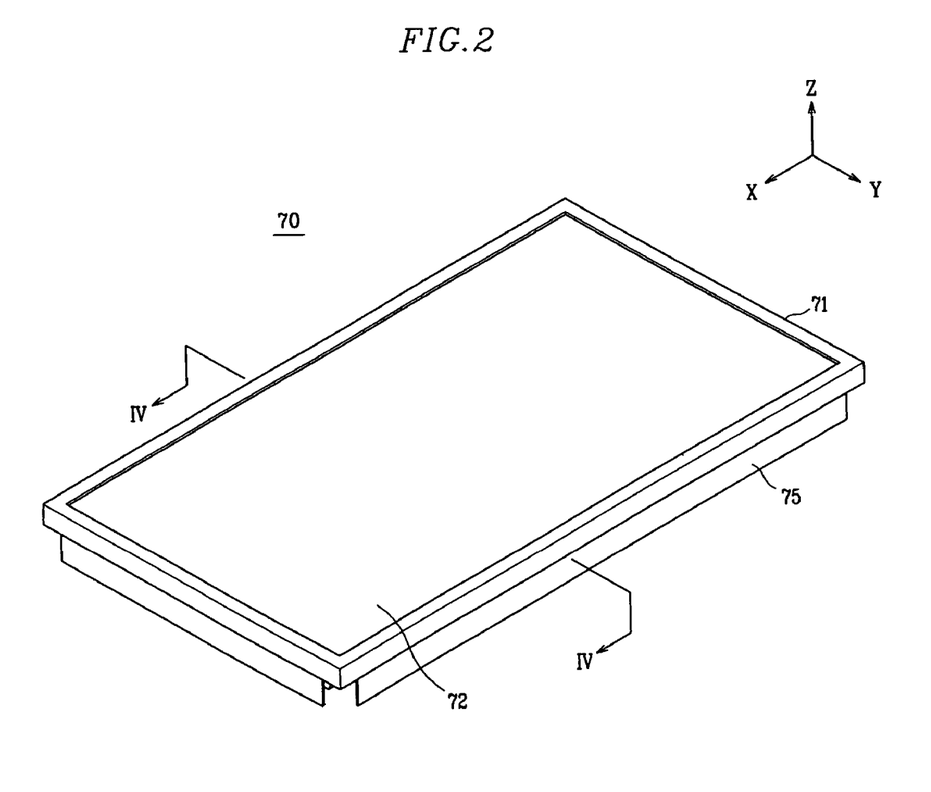
FIG. 2 is an assembled perspective view illustrating the first embodiment of the backlight assembly according to the present invention.

In FIG. 2, the elements of the backlight assembly 70 shown in FIG. 1 are assembled. The light emitted from the light sources 76 (see FIG. 1) forms a display area at the upper or front most surface (in the Z-axis direction) of the backlight assembly 70. Accordingly, it is possible to obtain a display area with uniform and excellent brightness.

Figure 3:
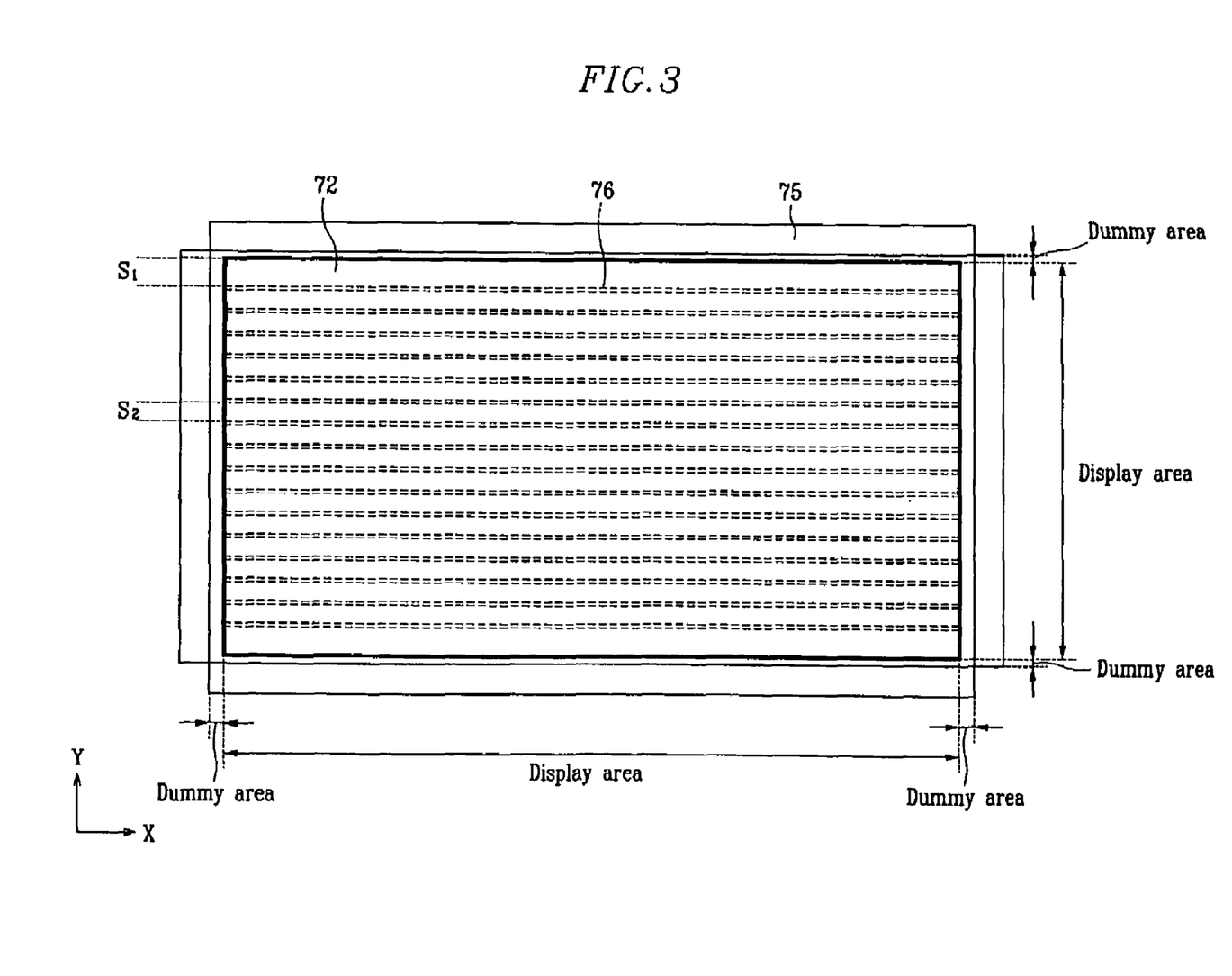
FIG. 3 is a partial plan view of the first embodiment of the backlight assembly according to the present invention.

FIG. 3 shows the appearance of the backlight assembly shown in FIG. 2 as seen in the Z-axis direction. In FIG. 3, the middle chassis 71 (see FIG. 2) is omitted for the purpose of clarity. Although sixteen light sources are shown in FIG. 3, this is not intended to limit the present invention, but only to exemplify the present invention. The number of light sources may be varied such as due to size of the backlight assembly, size of the individual light sources, or illumination requirements.

The display area is formed by the light emitted from the light sources 76, where each of the light sources 76 is indicated by dotted lines. A dummy area not emitting light is formed around the display area. The dummy area corresponds to an exterior to an outside perimeter of the display area where the middle chassis 71 surrounds and fixes the optical sheets 72. Since the area of the dummy area is much smaller than the area of the display area, light efficiency is not deteriorated greatly.

A plurality of light sources 76 are disposed below the display area. When the display area is divided with a plurality of light sources 76, a plurality of display areas, such as display area sections, extending in the longitudinal direction (X axis direction) between the light sources 76 are formed. Since the number of light sources 76 is sixteen in this embodiment, the number of divided display areas, or display area sections, is seventeen. In this case, the number of display areas $S_2$ surrounded by light sources 76 is fifteen. In other words, the display areas $S_2$ are flanked by light sources 76. That is, each display area $S_2$ is positioned between a pair of adjacent light sources 76. Although illustrated in FIG. 3 that the gap between the light sources 76 is constant, alternatively, the gap between the light sources 76 may be different. Two display areas $S_1$ surrounded with an edge of the display area and the light source 76 most adjacent thereto are formed at the upper and lower (first and second) ends of the display area. Thus, each display area $S_1$ is positioned between an inner side surface 751 and a light source 76 most adjacent thereto.

In the present invention, the average area of the display areas $S_2$ positioned between an adjacent pair of light sources 76 is smaller than or equal to the area of the display area $S_1$ positioned between an edge of the display area and the light source 76 most adjacent thereto. This is possible by adjusting the arrangement of the light sources 76 with respect to a bottom surface of the fixing member 75. That is, the light sources 76 are arranged such that the average area of the display areas $S_2$ is smaller than or equal to the each area of the display areas $S_1$.

Thus, in the present invention, it is not necessary to dispose the light sources 76 close to the edges of the display area in order to enhance the brightness of the edges of the display area. That is, it is not necessary to set the average area of the display areas $S_2$ greater than the area of the display area $S_1$. Accordingly, the brightness of the center is greatly enhanced, while the brightness of the edges is slightly decreased.

Since the gap between the light sources 76 is relatively small, the bright lines problem only very slightly occurs, if at all. In addition, it is possible to minimize the light loss at the edges. In the present invention, the light sources 76 are arranged in consideration of viewers' visibility, not in consideration of the overall brightness distribution of the display area since viewers watch the center of the display area instead of the edges of the display area. Therefore, viewers can consider the screen quality excellent when the brightness of the center is enhanced. On the contrary, since the attention of viewers is not concentrated on the edges of a display panel, even when the brightness of the edges is slightly decreased, the brightness is hardly deteriorated in consideration of a viewer's focus of visibility.

As a result, when the light sources 76 are arranged in consideration of a viewer's focus of visibility, it is possible to embody a clear image with enhanced brightness. Specifically, in order to enhance the brightness at the center, it is preferable that the light sources 76 are more concentrated within the central region of the display area than towards first and second sides of the display area. Accordingly, the brightness at the center can be enhanced, thereby providing a clearer image to the viewers.

On the other hand, the deterioration in brightness of the display area in the edge regions can be compensated for to some extent by deforming the fixing member 75. This case will be further described with reference to FIG. 4.

Figure 4:
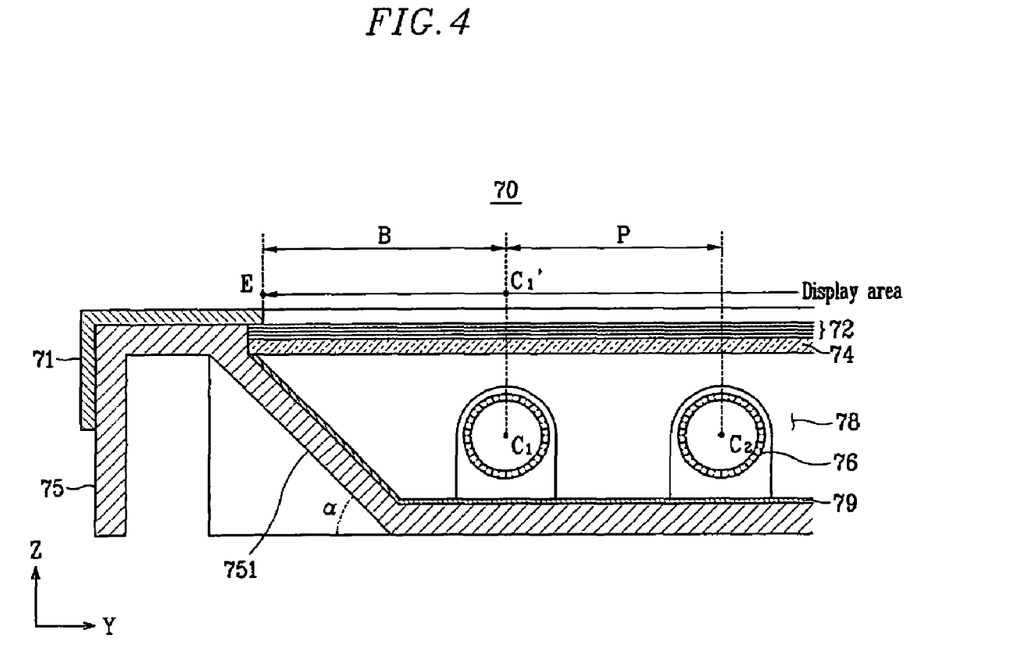
FIG. 4 is a cross-sectional view taken along Line IV-IV of FIG. 2.

FIG. 4 is a cross-sectional view taken along Line 44 of FIG. 2 and shows an internal structure of the backlight assembly 70. For the purpose of clarity, the edge of the display area is mainly shown in FIG. 4.

As shown in FIG. 4, the inclination angle $\alpha$ of the inner side surface 751 of the fixing member 75 is set to be approximately 50° or less, where the inclination angle $\alpha$ is measured from an outer surface of the inner side surface 751 to a plane coplanar with the bottom surface of the fixing member 75. By setting the inclination angle $\alpha$ to be about 50° or less, it is possible to compensate for the brightness deterioration at the edges of the display area as much as possible. That is, when the inclination angle $\alpha$ of the inner side surface 751 is about 50° or less, the light emitted from the light sources 76 is reflected to the maximum, thereby minimizing the optical loss. Accordingly, since a greater amount of light can be supplied upwardly towards a front of the backlight assembly 70, the brightness deterioration at the edges is not as noticeable.

In FIG. 4, the distance between the edge E of the display area, located at an edge E of the middle chassis 71, and a point $C_1'$ on the display area corresponding to the center $C_1$ of the light source 76 most adjacent thereto is defined as B. The pitch between neighboring light sources 76 (the distance between the centers $C_1$ and $C_2$ of an adjacent pair of light sources 76) is defined as P. In the present invention, B is set greater than or equal to P. That is, the light sources 76 are spaced from the edge of the display area by a distance at least as great as the pitch between an adjacent pair of light sources 76. Accordingly, the brightness at the center of the display area can be enhanced. It is preferable that B ranges from 20 mm to 24 mm. When B is less than 20 mm, the enhancement of brightness at the center of the display area is insignificant. When B is greater than 24 mm, the deterioration of brightness at the edge of the display area is too great, and may be noticeable to a viewer.

The deterioration of brightness at the edge of the display area can be at least substantially cancelled by adjusting the inclination angle of the inner side surface 751. The portion of the reflecting member 79 lying along the inner side surface 751 reflects light from an adjacent light source 76 towards the display area. The inclined portion of the reflecting member 79 makes up for the increased distance B between the edge of the display area to the first center of a light source 76. Accordingly, it is possible to display a clear image as seen with naked eyes according to a viewer's focus of visibility. Due to the enhancement of brightness, it is possible to reduce the height of the backlight assembly 70, as measured from a bottom side of the fixing member 75 to a front most surface of an optical sheet 72. As a result, it is possible to make the backlight assembly 70 more compact.

Figure 5:
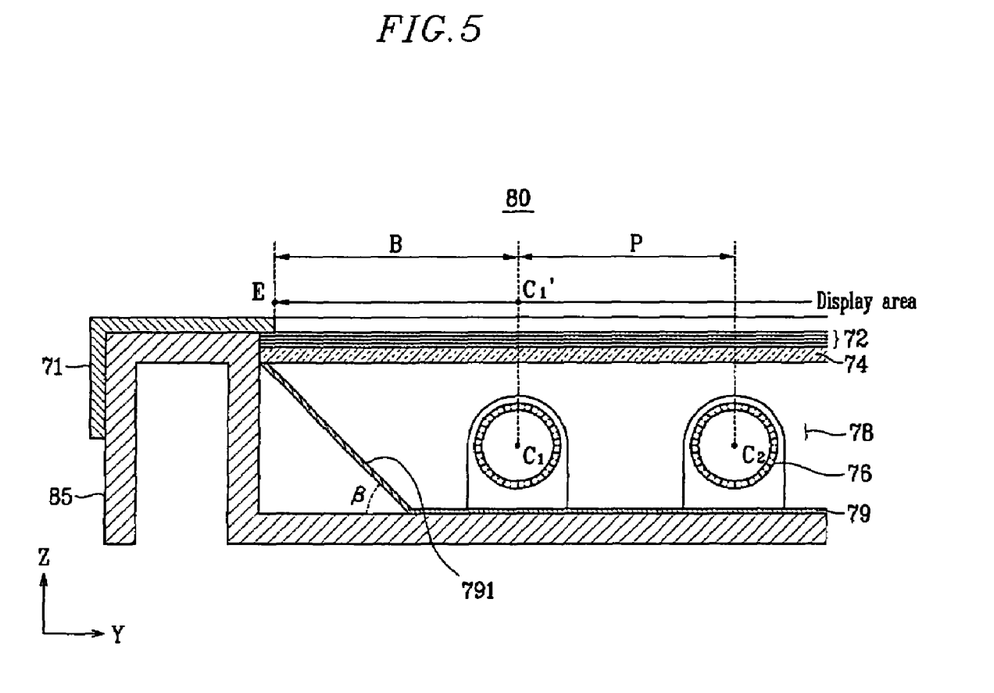
FIG. 5 is a cross-sectional view of a second embodiment of a backlight assembly according to the present invention.

FIG. 5 is a cross-sectional view of a second embodiment of a backlight assembly 80 according to the present invention. In the second embodiment of the present invention, an inner side surface of the fixing member 85 is parallel to the Z-axis direction. That is, the inner side surface of the fixing member 85 is not inclined as is the inner side surface 751 of the prior embodiment. The side surface 791 of the reflecting member 79 that is parallel to the longitudinal direction (X-axis direction) of the light sources 76 is formed as an inclined surface, and an end thereof is supported by the fixing member 85. That is, an end of the reflecting member 79 leans against an inner side surface of the fixing member 85, thereby forming an empty space between the side surface 791 and a corner line of the fixing member 85. The inclination angle $\beta$ of the inclined surface of the side surface 791 with respect to the bottom side of the fixing member 85 is preferably 50° or less. Therefore, the light emitted from all of the light sources 76 can be reflected upwardly towards the front most surface of the backlight assembly 80 by the reflecting member 79, thereby minimizing the optical loss.

Figure 6:
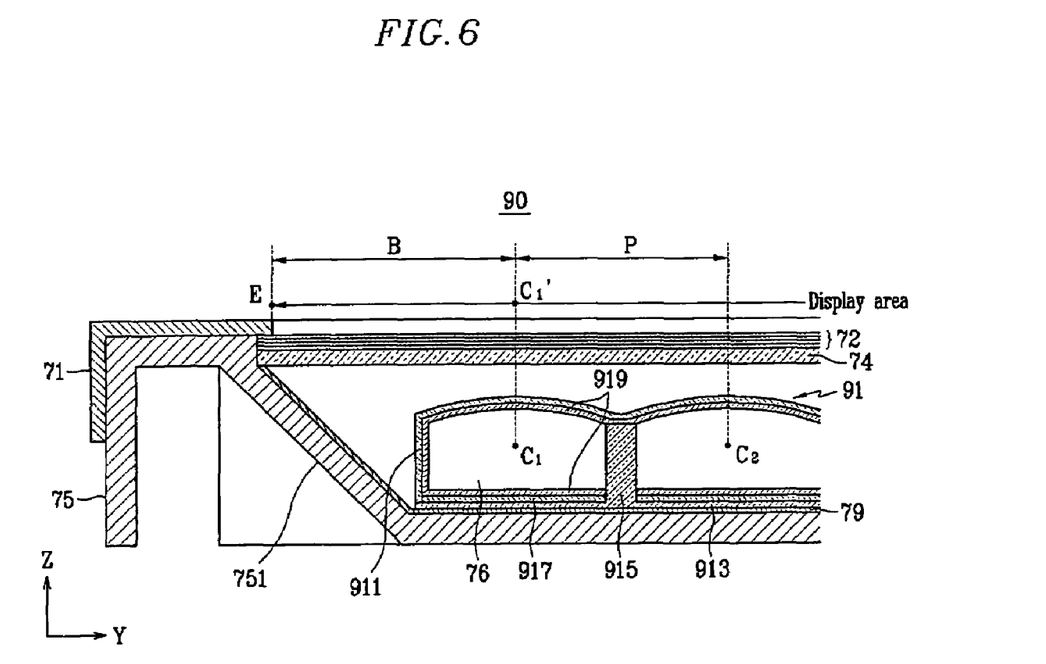
FIG. 6 is a cross-sectional view of a third embodiment of a backlight assembly according to the present invention.

FIG. 6 shows a sectional structure of the backlight assembly 90 according to a third embodiment of the present invention. FIG. 6 shows a flat fluorescent lamp 91 which is formed by collecting a plurality of light sources 76. The sectional structure of the backlight assembly 90 according to a third embodiment of the present invention is the same as that according to the first embodiment of the present invention except the flat fluorescent lamp 91. Therefore, same elements are referred to the same reference numerals and the detail explanation is omitted.

According to the third embodiment of the present invention, the light source 76 is defined as each channel forming a flat fluorescent lamp 91. The flat fluorescent lamp 91 includes an upper plate 911 and a lower plate 913. The upper portion of the upper plate 911 is curvedly-shaped, thereby forming a plurality of light sources 76. Each light source 76 is defined by a barrier 915. A discharge gas included in the light source 76 is excited by the electrodes (not shown) provided in each light source 76, and thereby generating ultraviolet rays. The ultraviolet rays are collided with phosphor layers 919 and then generate visible rays. A reflecting layer 917 is installed on the lower plate 913 in order to prevent a loss of light. Therefore, the light directed downward is completely reflected and it is possible to prevent a loss of light.

In the third embodiment of the present invention, B is set greater than or equal to P, which is the same as the first embodiment of the present invention. That is, the light sources 76 are spaced from the edge of the display area. Accordingly, the brightness at the center of the display area can be enhanced. In the third embodiment of the present invention, the fixing member 85 shown in FIG. 5 can be used.

Figure 7:
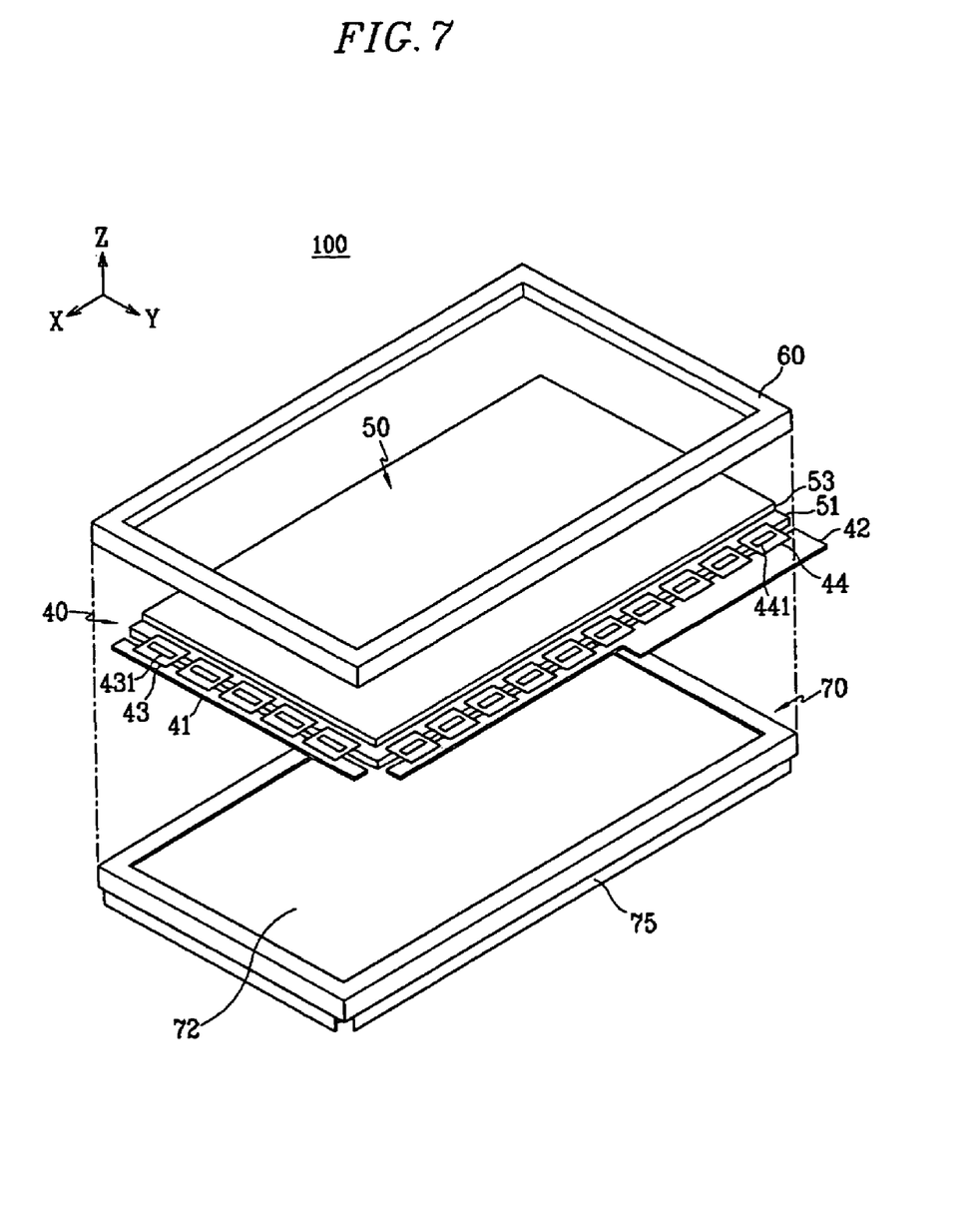
FIG. 7 is an exploded perspective view of an exemplary display device provided with the first embodiment of the backlight assembly according to the present invention.

FIG. 7 is an exploded perspective view illustrating an exemplary embodiment of the display device 100 in which an exemplary panel unit 50 is coupled to the first embodiment of the backlight assembly according to the present invention. Although an LCD panel is exemplified as the panel unit 50 in FIG. 7, it is intended not to limit the present invention, but to exemplify the present invention. Different types of light-receiving panel units not specifically described herein may be used in conjunction with the backlight assembly of these embodiments.

A panel unit assembly 40 includes a panel unit 50, gate and data driver integrated circuit ("IC") packages 43 and 44 that are connected thereto and transmit driving signals, and gate and data printed circuit boards ("PCB") 41 and 42. The gate and data driver IC packages 43 and 44 are electrically connected respectively to gate lines and data lines (not shown) formed on the panel unit 50. The driver IC packages 43 and 44 can be chip on film ("COF"), tape carrier package ("TCP"), and so on. IC chips 431 and 441 are mounted on the gate and data driver IC packages 43 and 44, respectively. The gate and data PCBs 41 and 42 can be received in the inner sides of a top chassis 60.

The panel unit 50 includes a thin film transistor ("TFT") panel 51 including a plurality of TFTs, a color filter panel 53 disposed over the TFT panel 51, and liquid crystal (not shown) injected between the two panels. Polarizers (not shown) are attached on the color filter panel 53 and below the TFT panel 51 and polarize light passing through the panel unit 50.

The TFT panel 51 is a transparent glass panel in which a plurality of TFTs are formed in a matrix. Source terminals formed on the TFT panel 51 are connected to data lines, and gate terminals formed thereon are connected to gate lines. In addition, pixel electrodes made of transparent indium tin oxide ("ITO") as conductive materials are formed in drain terminals thereof.

The gate lines and the data lines of the panel unit 50 are connected to the gate and data driver IC packages 43 and 44, respectively. If electrical signals from the data PCB 42 are input to the source terminals and electrical signals from the gate PCB 41 are input to the gate terminals of the TFTs, the TFTs are turned-on or turned-off in accordance with these input electrical signals, and then electrical signals necessary to form pixels to the drain terminals are output. A control board (not shown) electrically connecting to the data PCB 42 accepts driving signals from an exterior of the panel unit assembly 40 and applies the driving signals to the data lines and the gate lines of the panel unit 50.

The color filter panel 53 is arranged on the TFT panel 51 so that they face each other. The color filter panel 53 is a panel where RGB (red, green, blue) pixels, which can represent various colors as a light passes there through, are formed thereon. A common electrode made of ITO is formed on the entire surface, or substantially the entire surface, of the color filter panel 53. If a driving voltage is applied to gate terminals and source terminals of a TFT in order to turn-on the TFT, an electric field is formed between the pixel electrode and the common electrode of the color filter panel 53. An arrangement angle of the liquid crystal injected between the TFT panel 51 and the color filter panel 53 is varied due to the electric field such that light permeability is varied in accordance with the varied arrangement angle and thus a desirable pixel is obtained.

The gate PCB 41 transmits the gate driving signals to the panel unit 50 through the gate driver IC packages 43, and the data PCB 42 transmits the data driving signals to the panel unit 50 through the data driver IC packages 44.

The panel unit assembly 40 and the backlight assembly 70 are assembled together using the top chassis 60. Accordingly, the display device 100 is completed and can display a clear image. While the backlight assembly 70 is shown in conjunction with the display device 100, it should be understood that a display device similar to the display device 100 may also incorporate the backlight assembly 80, or any other alternate embodiment within the scope of the backlight assemblies described herein.

Hereinafter, the present invention is described in more detail with reference to experimental examples. The experimental examples are not intended to limit the present invention, but only to exemplify the present invention.

EXPERIMENTAL EXAMPLE 1

A 32-inch LCD panel is prepared. The number of lamps used in the experimental example is sixteen. The distance B as shown in FIG. 4 is set to 23.6 mm and the pitch P is set to 23.0 mm. A driving power is applied to the lamps arranged in the above-mentioned fashion. The brightness of the display area is measured in the width direction of the lamps, from a first side of the display area defined by edge E to an opposite side of the display area defined by an opposite edge E. The experimental result is indicated by a thick solid line in FIG. 8.

EXPERIMENTAL EXAMPLE 2

A 40-inch LCD panel is prepared. The number of lamps used in the experimental example is twenty. The distance B as shown in FIG. 4 is set to 25.6 mm and the pitch P is set to 23.5 mm. A driving power is applied to the lamps arranged in the above-mentioned fashion. The brightness of the display area is measured in the width direction of the lamps, from a first side of the display area defined by edge E to an opposite side of the display area defined by an opposite edge E. The experimental result is indicated by a thin solid line in FIG. 8.

COMPARATIVE EXAMPLE

A conventional 32-inch LCD panel is prepared. The number of lamps used in the comparative example is sixteen. The distance B as shown in FIG. 4 is set to 3.3 mm and the pitch P is set to 24.5 mm. A driving power is applied to the lamps arranged in the above-mentioned fashion. The brightness of the display area is measured in the width direction of the lamps, from a first side of the display area defined by edge E to an opposite side of the display area defined by an opposite edge E. The experimental result of the comparative example is indicated by a dotted line in FIG. 8.

Figure 8:
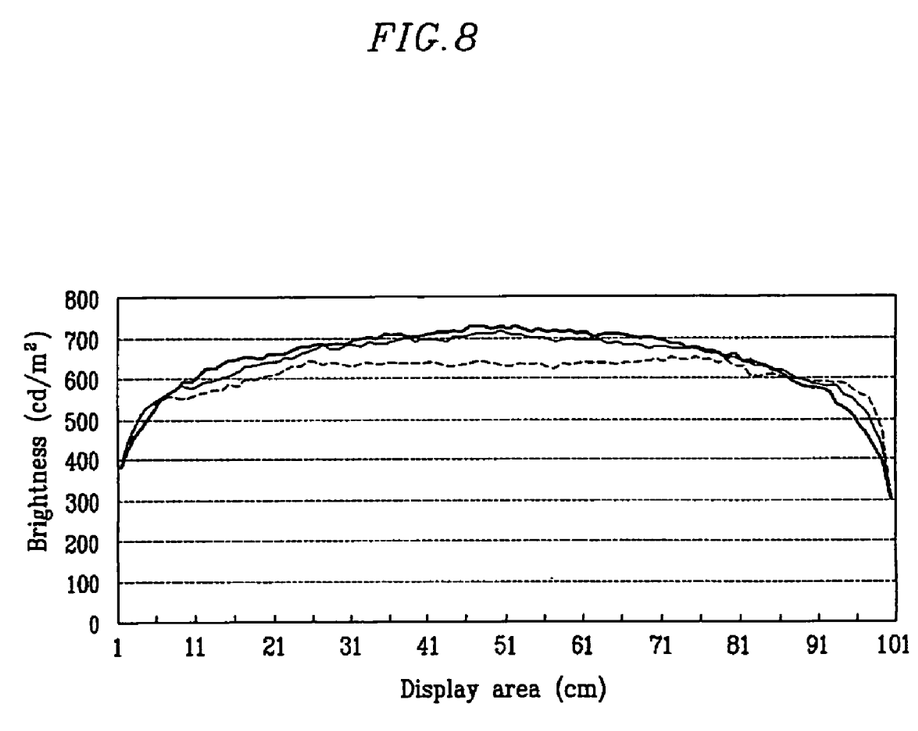
FIG. 8 is a graph illustrating test results of experimental examples and a comparison example according to the present invention.

In the graph shown in FIG. 8, the brightness (measured in candelas per square meter or $cd/m^2$) is indicated in the Y axis and the distance (cm) in the display area is indicated in the X axis. In Experimental examples 1 and 2, it can be seen from FIG. 8 that the brightness at the center and in a central region of the display area is increased and the brightness at the edges is decreased. On the contrary, in the comparative example, it can be seen that the brightness is uniform as a whole, except for the edges.

When the LCD panel is actually viewed with naked eyes of a viewer, the screens of the LCD panels according to Experimental examples 1 and 2 are clearer to a viewer because a viewer will focus on a central region of the display area rather than the edges and the brightness at the center of the LCD panel is increased. On the other hand, although the brightness at the edges of the LCD panel is decreased, the substantial brightness is not decreased greatly. This is because the optical loss is minimized by adjusting the inclined surface of the fixing member.

An exemplary method of enhancing a display image to a viewer thus includes providing a plurality of light sources, forming a display area by light emitted from the plurality of light sources, arranging the plurality of light sources longitudinally in parallel to each other within a fixing member, arranging an outermost light source in parallel with an edge of the display area, and providing a distance between the outermost light source and the edge of the display area that is greater than a distance between light sources that are adjacent to each other increasing brightness in a central region of the display area. Also, the method may further include disposing a reflecting member on the fixing member, and inclining a side surface of the reflecting member with respect to the edge of the display area. The method may further include utilizing other features of the embodiments as described herein.

Although the exemplary embodiments of the present invention have been described, it can be easily understood by those skilled in the art that the present invention may be modified in various forms without departing from the spirit and scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   a plurality of light sources longitudinally arranged in parallel to each other; and
   a fixing member receiving the plurality of light sources,
   wherein, when a display area formed by light emitted from the plurality of light sources is divided by the plurality of light sources into a plurality of display area sections, an average area of the display area sections between light sources adjacent to each other is less than or equal to an area of a display area section between an edge of the display area and the light source most adjacent thereto,
   wherein a distance between the edge of the display area and a point of the display area corresponding to a center of the light source most adjacent thereto ranges from 20 mm to 24 mm, and
   wherein the edge of the display area defines a terminal edge of the display area and an inner side surface extending from the edge extends in a length direction of the light sources and is formed as an inclined surface and an inclination angle of the inclined surface is less than or equal to 50° relative to a plane containing the plurality of light sources.

2. The backlight assembly of claim 1, further comprising a reflecting member disposed on the fixing member and reflecting the light emitted from the light sources,
   wherein a side surface of the reflecting member extending in a length direction of the light sources is formed as an inclined surface and an inclination angle of the inclined surface is less than or equal to 50° with respect to a bottom surface of the fixing member.

3. The backlight assembly of claim 2, wherein the reflecting member is a reflecting sheet.

4. The backlight assembly of claim 2, wherein an edge of the side surface of the reflecting member extends to a greater height within the fixing member than a height of the light sources received within the fixing member.

5. The backlight assembly of claim 2, further comprising a diffusing plate supported on an edge of the side surface of the reflecting member.

6. The backlight assembly of claim 1, wherein an inner side surface of the fixing member extending in a length direction of the light sources is formed as an inclined surface and an inclination angle of the inclined surface is less than or equal to 50°.

7. The backlight assembly of claim 6, further comprising a reflecting member lining the inner side surface and a bottom interior surface of the fixing member.

8. The backlight assembly of claim 1, wherein a distance between a pair of light sources that are adjacent to each other in a central region of the display area is less than a distance between a pair of light sources that are adjacent to each other closer to the edge of the display area.

9. The backlight assembly of claim 1, wherein a distance between the edge of the display area and a point of the display area corresponding to a center of the light source most adjacent thereto is greater than or equal to a pitch between light sources adjacent to each other.

10. The backlight assembly of claim 1, wherein the fixing member is made of a metal.

11. The backlight assembly of claim 1, wherein the plurality of light sources are collected together and then forms a flat fluorescent lamp.

12. The backlight assembly of claim 1, wherein the light sources are lamps.

13. The backlight assembly of claim 1, wherein the light sources are light emitting diodes formed in a line.

14. The backlight assembly of claim 1, wherein each light source extends parallel to the edge of the display area.

15. A display device comprising:
   a panel unit displaying an image; and
   a backlight assembly supplying light to the panel unit,
   wherein the backlight assembly comprises a plurality of light sources longitudinally extending in parallel to each other and a fixing member receiving the plurality of light sources,
   wherein, when the display area formed by light emitted from the plurality of light sources is divided by the plurality of light sources into a plurality of display area sections, an average area of the display area sections between light sources adjacent to each other is less than or equal to an area of a display area section between an edge of the display area and the light source most adjacent thereto,
   wherein a distance between the edge of the display area and a point of the display area corresponding to a center of the light source most adjacent thereto ranges from about 20 mm to about 24 mm, and
   wherein the edge of the display area defines a terminal edge of the display area and an inner side surface extending from the edge extends in a length direction of the light sources and is formed as an inclined surface and an inclination angle of the inclined surface is less than or equal to 50° relative to a plane containing the plurality of light sources.

16. The display device of claim 15, further comprising a reflecting member disposed on the fixing member and reflecting the light emitted from the light sources,
   wherein a side surface of the reflecting member extending in a length direction of the light sources is formed as an inclined surface and an inclination angle of the inclined surface is less than or equal to 50° with respect to a bottom surface of the fixing member.

17. The display device of claim 16, wherein the reflecting member is a reflecting sheet.

18. The display device of claim 15, wherein an inner side surface of the fixing member extending in a length direction of the light sources is formed as an inclined surface and an inclination angle of the inclined surface is less than or equal to 50°.

19. The display device of claim 15, wherein a distance between the edge of the display area and a point of the display area corresponding to a center of the light source most adjacent thereto is greater than or equal to a pitch between light sources adjacent to each other.

20. The display device of claim 15, wherein the plurality of light sources are collected together and then forms a flat fluorescent lamp.

21. The display device of claim 15, wherein the light sources are lamps.

22. The display device of claim 15, wherein the fixing member is made of a metal.

23. The display device of claim 15, wherein the panel unit is a liquid crystal display panel.

24. A method of enhancing a display image to a viewer, the method comprising:

provilding a plurality of light sources;

forming a display area by light emitted from the plurality of light sources;

arranging the plurality of light sources longitudinally in parallel to each other within a fixing member;

arranging an outermost light source in parallel with an edge of the display area; and, providing a distance between the outermost light source and the edge of the display area that is greater than a distance between light sources that are adjacent to each other increasing brightness in a central region of the display area, the distance between the outermost light source and the edge of the display area ranges from about 20 mm to about 24 mm, wherein the edge of the display area defines a terminal edge of the display area and an inner side surface extending from the edge extends in a length direction of the light sources and is formed as an inclined surface and an inclination angle of the inclined surface is less than or equal to 50° relative to a plane containing the plurality of light sources.

25. The method of claim 24, further comprising disposing a reflecting member on the fixing member, and inclining a side surface of the reflecting member with respect to the edge of the display area.

* * * * *